United States Patent [19]

Dwinell

[11] Patent Number: 5,256,225

[45] Date of Patent: Oct. 26, 1993

[54] PAIL CLOSURE APPLICATION METHOD

[75] Inventor: Davis B. Dwinell, Carol Stream, Ill.

[73] Assignee: Royal Packaging Industries Van Leer B.V., Amstelveen, Netherlands

[21] Appl. No.: 819,969

[22] Filed: Jan. 13, 1992

[51] Int. Cl.$^5$ .............................................. B32B 31/16
[52] U.S. Cl. ................................ 156/73.1; 156/309.6; 156/216; 156/294; 156/69; 220/254; 220/361; 220/363; 220/DIG. 14; 220/DIG. 31
[58] Field of Search .................... 156/69, 73.1, 309.6, 156/212, 216, 294; 215/353, 354; 220/254, 361, 362, 363, DIG. 14, DIG. 31

[56] References Cited

U.S. PATENT DOCUMENTS

| | | | |
|---|---|---|---|
| 2,561,596 | 7/1951 | Rieke | 215/354 X |
| 3,672,547 | 6/1972 | Kozlowski | 220/254 X |
| 3,873,132 | 3/1975 | Czerwiak | 285/21 |
| 4,002,516 | 1/1977 | Gaborieau et al. | 156/69 |
| 4,232,622 | 11/1980 | Weierman et al. | 156/69 X |
| 4,746,025 | 5/1988 | Krautkrämer et al. | 156/69 X |
| 4,880,580 | 11/1989 | Bowers et al. | 264/26 |
| 5,148,936 | 9/1992 | DeGrow | 220/254 |

FOREIGN PATENT DOCUMENTS

| | | | |
|---|---|---|---|
| 2338908 | 2/1975 | Fed. Rep. of Germany | 156/73.1 |
| 8203347 | 5/1983 | Netherlands . | |

*Primary Examiner*—David A. Simmons
*Assistant Examiner*—Mark A. Osele

[57] ABSTRACT

A method of securing a two piece plastic nozzle and overlying screw cap closure assembly to a plastic pail cover wherein the nozzle has a cylindrical body portion which is inserted into a cover opening to form a friction fit therewith. The overlying screw cap is then rigidly supported as a sonic welding horn is brought into axial engagement with the protruding nozzle body portion. Energization of the sonic welding horn causes the nozzle body portion to soften and deform radially outwardly into a circumferentially enlarged rivet connection. Continued axial displacement of the sonic welding horn creates a plastic bond about the periphery of the rivet connection so as to close off any leakage path therearound. At the same time any radial dispersion of plastic material resulting from the bonding process is locally contained about the rivet connection periphery.

6 Claims, 1 Drawing Sheet

PAIL CLOSURE APPLICATION METHOD

BACKGROUND OF THE INVENTION

This invention is directed to a method of securing a synthetic plastic closure assembly to a synthetic plastic pail cover.

The current pressing need to eliminate plastic packaging materials from the solid waste stream has prompted an in-depth cost analysis of the most effective approach for getting industrial size plastic pails converted into post consumer regrind plastic resin. These pails, by and large, are in the five gallon size range and consist of a generally cylindrical vessel open at one end to which a cover is mechanically applied after filling. The cover, in turn, has a pouring opening to which a closure assembly is secured to enable subsequent decanting and reclosing. Pail closures normally employed in this environment are of the type shown in U.S. Pat. No. 4,568,006 dated Feb. 4, 1986 and consist of a plastic nozzle embodying a nestable pouring spout which threadedly receives an overlying screw cap. The nozzle is further provided with a circumferential sealing flange secured to a neck surrounding the pail cover opening by means of a rigid metal crimping ring. While this type pail closure construction has proven highly successful in the past, it has the serious shortcoming for present day needs of incorporating a metal component in an otherwise all plastic construction. The additional labor required to remove this metal ring so that the pail cover can be accepted into the plastic recycling process is a significant negative factor. This drawback has prompted the search for an effective alternative method of securing an all plastic closure assembly to the pail cover utilizing one of the known plastic to plastic bonding techniques. Although such known bonding techniques are numerous including spin welding, sonic welding, hot plate welding and induction welding. None have to date provided a completely satisfactory answer to the above described problem at hand.

To be successful such alternative method must produce a closure pail cover joint capable of withstanding all of the commonly accepted and closely regulated performance criteria for shipping hazardous liquid products. These criteria would include static and hydraulic internal pressure build up, drop test impact resistance at both high and low temperature extremes, environmental stress crack resistance under widely varying conditions and the like. These criteria, moreover, must be met with a high degree of consistency and repeatability. Each of the above enumerated known plastic to plastic bonding techniques has one or more serious limitations when applied to the instant situation. For example, most commonly employed plastic to plastic bonding techniques are largely ineffective when practiced with dissimilar plastic melt characteristics at the bond interface. That is to say, such methods in and of themselves will not provide the necessary joint strength and sealability. Induction welding, of course, requires the introduction of a metallic contaminant which is precisely what the invention seeks to avoid. Considerations of equipment cost and fabrication cycle times are also of importance in deriving a truly workable system.

SUMMARY OF THE INVENTION

The pail closure application method of the invention overcomes the above mentioned prior art deficiencies by effectively joining a two piece plastic closure assembly to a suitably formed opening in a plastic pail cover. The closure assembly consists of a nozzle member having a tubular body surrounded by a circumferentially enlarged flange or collar. The nozzle member further incorporates a nestable pouring spout to which an overlying screw cap is threadedly engaged. In accordance with the invention the nozzle body is pushed into the pail cover opening so as to seat the circumferentially enlarged nozzle collar therearound. The closure pail cover preassembly is then rigidly supported by seating the overlying screw cap in a cap locating nest. A sonically energized welding horn is axially displaced toward the cap nest so as to engage the nozzle body end portion and deform said end portion radially outwardly into a circumferentially enlarged annular rivet head. Continued axial displacement of the welding horn fuses the rivet head perimeter to the pail cover underface creating a permanent liquid tight seal. This closure application method is seen as rather a hybrid process whereby the rivet forming phase imparts high strength and tamper resistance while the terminal phase creates a plastic to plastic bond effectively sealing off any possible leakage path at the joint interface. The resulting closure pail cover joint possesses a high degree of structural integrity and is ideally suited for recycling used pails into post consumer regrind resin. Moreover, the process employs a shortened time cycle compared to other methods and is carried out with available, relatively cost effective equipment.

It is accordingly a principal object of the invention to provide a new method of permanently affixing a synthetic plastic closure assembly to a synthetic plastic pail cover opening.

Another object is to provide a new method of securing a plastic closure assembly within a plastic container wall opening by means of a sonic energy source.

A further object is to provide a method of forming a clean, high strength plastic to plastic closure container wall joint with minimum time dwell and cost.

Other and more detailed objects will in part be obvious and in part pointed out as the description taken in conjunction with the accompanying drawing proceeds.

Figure 1:
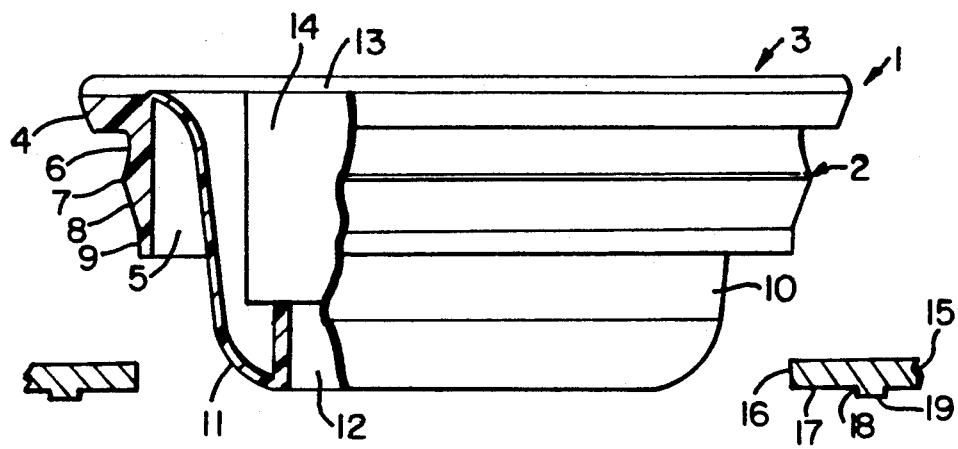
FIG. 1 is a part sectional part elevational exploded view of the closure assembly and container wall opening prior to securing in accordance with the method of the invention.

The container closure assembly generally indicated at numeral 1 in FIG. 1 is seen to consist of a nozzle 2 molded of low density polyethylene plastic resin and an overlying screw cap 3 molded of high density polyethylene plastic resin. The nozzle 2 is formed with a circumferentially extending flange or collar 4. A cylindrical nozzle throat 5 extends from the undersurface of the flange 4 having a cylindrical seat 6, a retaining bead 7, a conical lead-in surface 8 and a cylindrical pilot portion 9. The nozzle 2 is further formed with a nestable pouring spout 10 consisting of an outer flexible wall 11 and a rigid inner spout portion 12. Such nestable pouring spouts are well known as shown in U.S. Pat. No. 4,568,006 dated Feb. 4, 1986. The overlying screw cap 3 is provided with a circumferentially enlarged top wall 13 which bridges the annular void created by the nozzle flexible wall 11 and seats on top of the flange 4 with the spout in retracted or nested position. A cylindrical sidewall 14 depends from the cap top 13 and carries an internal screw thread (not shown) for engagement with the nozzle rigid inner spout portion 12.

The pail cover or lid 15 is disc shaped having a peripheral configuration for engagement with the sidewall of a plastic pail body (not shown). The lid 15 is molded of a high density polyethylene plastic resin normally in a thickness range of 0.060 to 0.100 inches. A pour opening 16 is molded in the lid 15 dimensioned to form a snug interference fit engagement with the nozzle throat cylindrical seat 6. The undersurface 17 of the pail lid 15 immediately surrounding the opening 16 is bordered by an annular step 18 creating a peripheral raised surface 19.

In performing the method steps of the invention the closure assembly 1 is axially displaced toward the pail lid 15 as shown in FIG. 1. After entry of the pilot portion 9 and lead-in surface 8, the pail opening 16 tightly snaps into the nozzle cylindrical seat 6 making a snug interference fit therewith. The top wall 13 of the closure cap 3 is rigidly supported within a cup shaped nest 20 having a cylindrical sidewall 21 which supports the exterior surface of the pail cover surrounding the closure assembly. Thus, as clearly seen in FIG. 2, the nozzle flange 4 is tightly clamped between the pail cover 15 and the cap top wall 13 all of which is supported by the nest 20.

Figure 2:
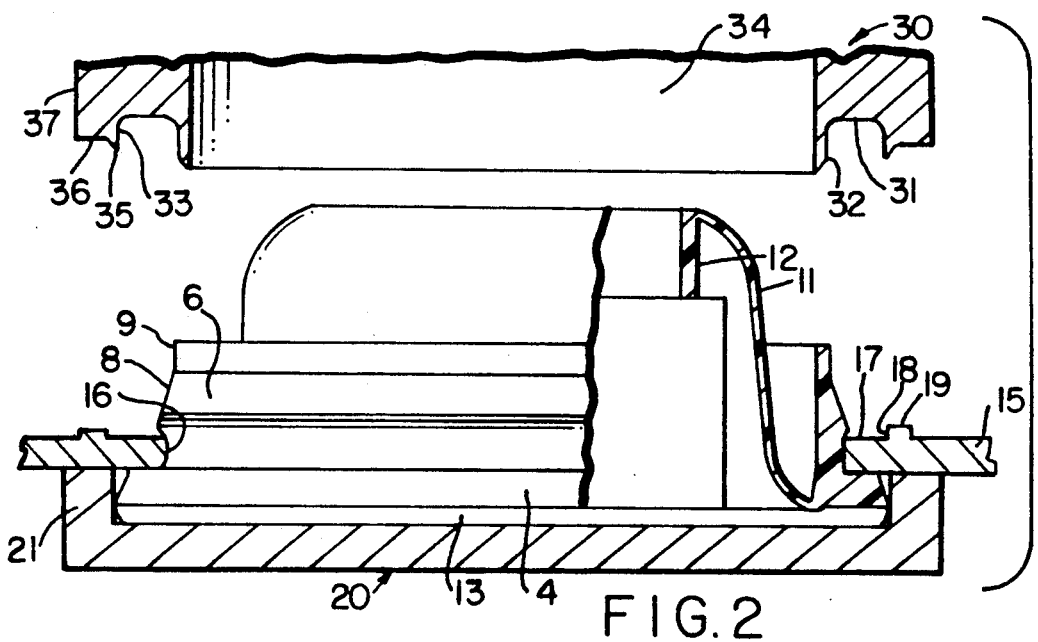
FIG. 2 is a part sectional part elevational view showing the closure assembly and pail opening positioned between the cap nest and welding horn for performance of an initial step of the invention method.

A sonic welding horn 30 is axially aligned with the nest 20 and formed with a downwardly opening annular channel 31. As also seen in FIG. 2 the channel 31 has a gradually radiused interior surface defined by an inner wall 32 and an outer wall 33. The inner wall 32 extends axially beyond the outer wall and forms a relatively narrow sleeve surrounding the horn interior cylindrical surface 34. The outer wall 33 terminates in a relatively sharp annular rib 35 surrounded by a flat annular end surface 36 which joins the horn exterior cylindrical surface 37.

Figure 3:
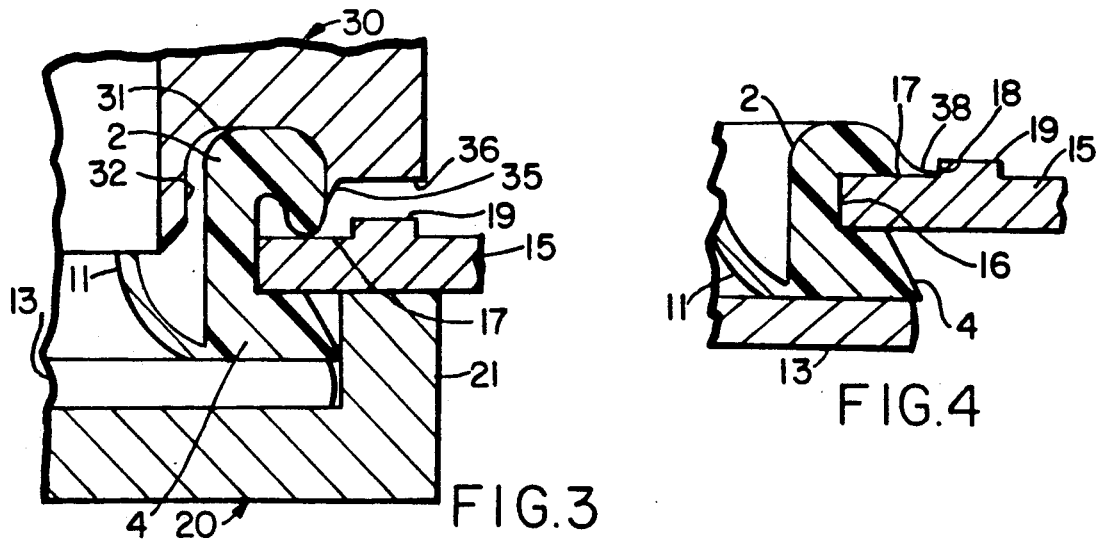
FIG. 3 is similar to FIG. 2 showing an advanced method step.
Figure 4:
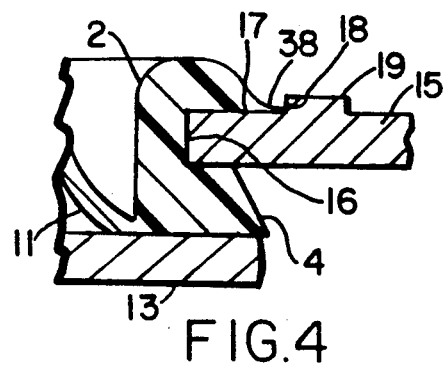
FIG. 4 is a vertical sectional view showing the closure container wall joint at completion of the invention process.

As the invention process continues the sonic welding horn 30 is axially displaced relative to the nest 20 causing the annular channel 31 to engage the end pilot portion 9 of the nozzle throat 2. At this point the sonic horn is activated by means of a power supply generator (not shown) in a conventional manner which instantaneously brings the nozzle pilot portion 9 and lead-in surface portion 8 to an elevated temperature. Continued axial displacement compressing the closure assembly against the nest 20, as seen in FIG. 3, results in a swaging action against the nozzle throat whereby the softened plastic material is deformed radially outwardly so as to overlie the pail cover undersurface 17. At this stage the inner wall 32 of the horn 30 extends into the nozzle throat 5 opposite the cylindrical seat 6 and acts as a baffle against radially inward flashing of plastic resin during the securing operation. The annular rib 35 which serves as an energy concentrator on the horn 30, is at this stage axially spaced from the pail undersurface 17 a distance approximately equal to the axial spacing between the horn annular flat end surface 36 and peripheral raised surface 19 surrounding the pail opening. The final increment of axial displacement of the horn 30 relative to the nest 20 produces the finished closure container wall joint as shown in FIG. 4. This results from the final deformation of the nozzle throat 2 within the sonic horn channel 31. At this point it should be noted a critical relationship exists between the volumetric displacement of the channel 31 and the mass of plastic resin in the nozzle throat extending beyond the cylindrical section 6. This relationship is such that when the horn 30 bottoms out with a predetermined set force on the nest 20, the channel 31 is completely filled with molten plastic material. Under these conditions then a small amount of flash or molten plastic 38 is expelled radially outwardly underneath the horn rib 35 which at the end of the cycle becomes embedded in the expelled plastic and acts as an energy concentrator to bond this residue of material to the cover surface 17. At the same instant the horn end surface 36 contacts the raised annular pail lid surface 19 making a tight seal thereagainst. Here also it can be seen that the annular step 18 on the lid undersurface creates a dam about the peripheral bonding zone so as to contain and localize any residue of expelled resin or flash that occurs at the final stage of the welding cycle. Unless this radial dispersion of melted resin is completely captured, the risk of contaminating the subsequently filled container exists. As clearly seen in FIG. 4 the end result is a completely formed annular rivet head connection possessing a high degree of structural integrity surrounded by a peripheral bonding zone which provides a 360 degree hermetic seal.

The bonding process of the invention while employing sonic energy as a heat source does not sonically weld the parts together in the usual sense where reliance is placed solely on a homogeneous molecular interlocking at the joint interface to achieve a leak proof permanent connection. Instead the invention method is a hybrid which relies on sonic energy to initially swage the nozzle throat into a permanent rivet connection creating a high degree of structural integrity and then forms a surface bonding about the rivet periphery to effectively seal off any leakage path. The combination of these two securing stages has been found to produce a vastly superior result. The invention method advantageously lends itself to securing closure assemblies to container lids molded of dissimilar plastic materials and different densities and melt indices beyond just those materials listed hereinbefore by way of example. Also alterations in the pail cover could be made so as to place the closure either in a recessed pocket or on a raised boss as is common in pail construction.

Various other changes in or modifications of the securing method of the invention would suggest themselves to those skilled in the art and could be made without departing from the spirit or scope of this invention. It is accordingly intended that all matter contained in the above description or shown in the accompanying drawing shall be interpreted as being illustrative and not in a limiting sense.

I claim:

1. A method of securing a synthetic plastic closure assembly within a synthetic plastic pail cover opening wherein said closure assembly consists of a nozzle having a distal end portion and overlying cap comprising the steps of inserting said closure assembly into said pail cover opening so that the distal end portion of said nozzle extends axially therethrough and introducing said pail cover and closure assembly into the working zone of a sonic welding machine defined by a cap supporting structure and a sonic welding horn including a central sleeve portion, axially displacing said sonic welding horn relative to said cap supporting structure so as to engage said nozzle distal end portion and urge said closure cap against said cap supporting structure, energizing said sonic welding horn during said axial displacement so as to permanently deform said nozzle distal end portion radially outwardly forming a rivet connection within said pail cover opening, and tightly clamping said rivet connection against said closure cap creating a plastic to plastic resin bond with said cover at said deformed distal end portion.

2. A method as in claim 1 and creating said plastic resin bond about the periphery of said formed rivet connection.

3. A method as in claim 2 and creating said peripheral plastic resin bond by means of an axially protruding circular energy concentrator on said sonic welding horn.

4. A method as in claim 2 and containing said peripheral plastic resin bond against uncontrolled radial dispersion.

5. A method of securing a synthetic plastic closure within a pail cover opening wherein said closure consists of a cylindrical nozzle having a distal end portion, said nozzle surrounded by an annular flange comprising the steps of inserting said closure assembly into said pail cover opening so that the distal end portion of said nozzle extends axially therethrough and introducing said pail cover and closure assembly into the working zone of a sonic welding machine defined by a nozzle supporting structure and a sonic welding horn including a central sleeve portion axially displacing said sonic welding horn relative to said supporting structure so as to engage said nozzle distal end portion and urge said nozzle against said supporting structure, energizing said sonic welding horn during said axial displacement so as to permanently deform said nozzle distal end portion radially outwardly forming a rivet connection within said pail cover opening while simultaneously inserting a central sleeve portion of said horn within said nozzle and tightly clamping said rivet connection against said annular flange.

6. A method as in claim 5 and inserting said horn sleeve portion axially beyond said pail cover opening.

* * * * *